United States Patent [19]
Frick

[11] Patent Number: 5,779,188
[45] Date of Patent: Jul. 14, 1998

[54] FLIGHT DEVICE

[76] Inventor: Alexander Frick, Dr. Josef Hoop-Strasse 633, Fl-9492 Eschen, Liechtenstein

[21] Appl. No.: 844,568

[22] Filed: Apr. 21, 1997

Related U.S. Application Data

[63] Continuation of Ser. No. 433,495, filed as PCT/CH94/00185, Sep. 20, 1994, abandoned.

[30] Foreign Application Priority Data

Sep. 21, 1993 [CH] Switzerland ............... 2842/93

[51] Int. Cl.$^6$ .................................................. B64C 29/00
[52] U.S. Cl. ...................... 244/4 A; 244/23 B; 244/12.5; 244/52
[58] Field of Search .................... 244/4 A, 23 A, 244/12.3, 12.5, 23 B, 23 D, 52, 57, 149, 53 B

[56] References Cited

U.S. PATENT DOCUMENTS

| | | | |
|---|---|---|---|
| 2,171,817 | 9/1939 | Wagner et al. | 244/57 |
| 2,390,161 | 12/1945 | Mercier | 244/57 |
| 2,401,584 | 6/1946 | Rhines | 244/53 B |
| 3,023,980 | 3/1962 | Martin et al. | 244/4 A |
| 3,065,936 | 11/1962 | Messerschmitt | 244/23 B |
| 3,243,144 | 3/1966 | Hulbert et al. | 244/4 A |
| 3,273,824 | 9/1966 | Owens | 244/4 A |
| 3,381,917 | 5/1968 | Moore et al. | 244/4 A |
| 3,436,037 | 4/1969 | Stanley | 244/149 |
| 3,454,238 | 7/1969 | Goodson | 244/12.3 |
| 3,759,469 | 9/1973 | Nimylowycz | 244/149 |
| 4,433,819 | 2/1984 | Carrington | 244/52 |

*Primary Examiner*—Andres Kashnikow
*Assistant Examiner*—Tien Dinh
*Attorney, Agent, or Firm*—Laurence R. Brown

[57] ABSTRACT

A flight vehicle which can be joined and firmly strapped to a load, the load being either a human pilot (P) or a remote-controlled pilot. The flight vehicle comprises a supporting frame for attaching to the load, a driving arrangement (100) incorporating a piston engine, and which is connected directly to the shrouded propeller (200) by means of a rotating drive shaft (108) for the purpose of setting up an air stream, also at least two jet pipes (300) which open into outlet nozzles (304, 305) mounted laterally alongside the load or the human pilot (P), whereby the said outlet nozzles can be adjusted to change the direction of the discharged air stream. It is by means of the outlet nozzles (304, 305) that the lift force is set up; this latter force enables the human pilot to lift off the ground to make hover or translatory flights. The shrouded propeller (200) is fitted with an intake funnel (202), which is essentially above the human pilot (P) or the load when the flight vehicle is in a normal flight position. The rotating drive shaft (108) which drives the propeller (200) is then essentially in a vertical position and the outlet nozzles (304, 305) are then essentially in a vertical gravity symmetry plane. The air stream produced by the propeller (200') is discharged through the jet pipes (300) at a subsonic velocity. The advantages of this flight vehicle are to be seen in the fact that the motive energy from the driving arrangement (100) is converted into a lift thrust with a very high degree of efficiency. The use of lightweight materials combined with the low fuel consumption allows prolonged flight periods.

8 Claims, 13 Drawing Sheets

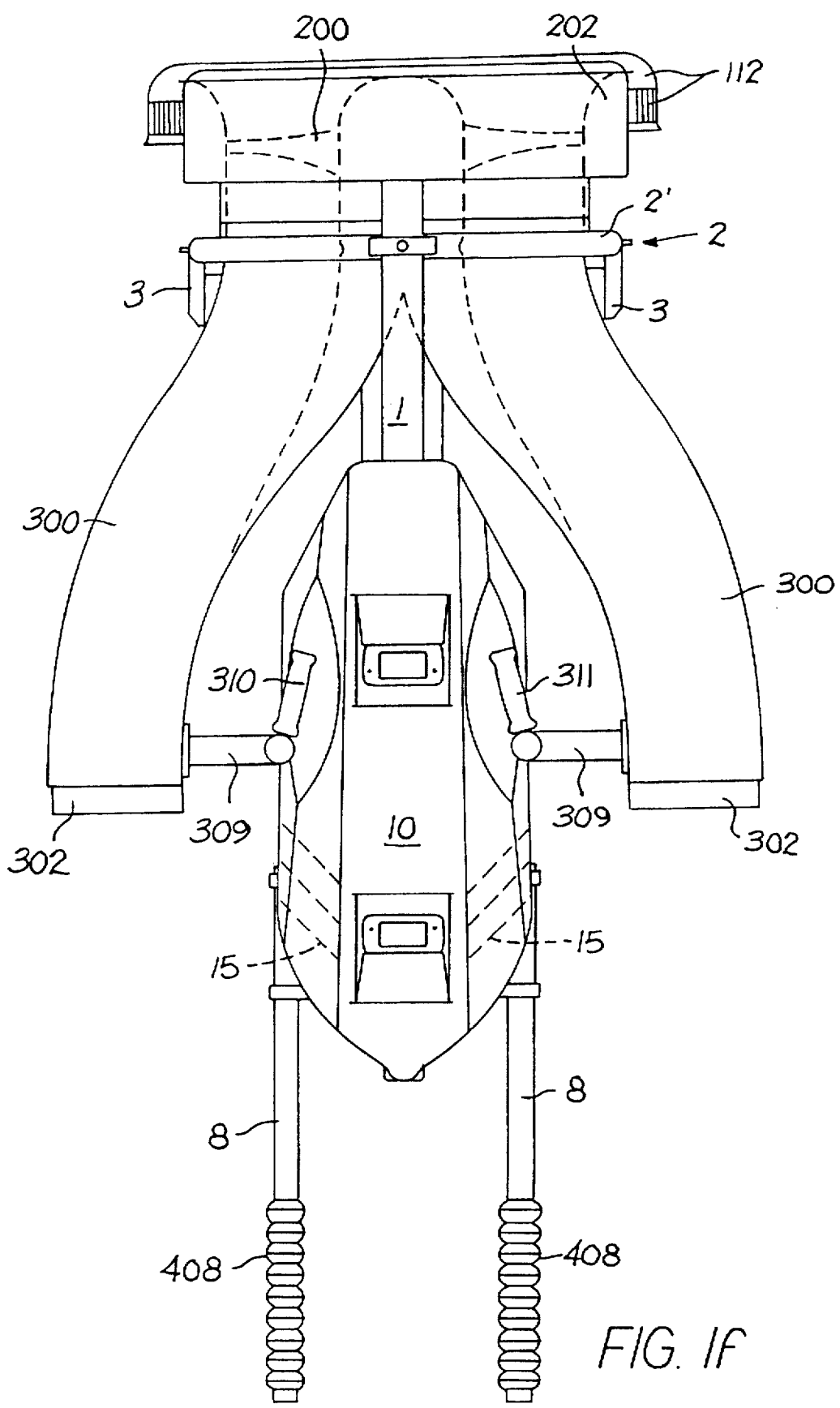
FIG. IF

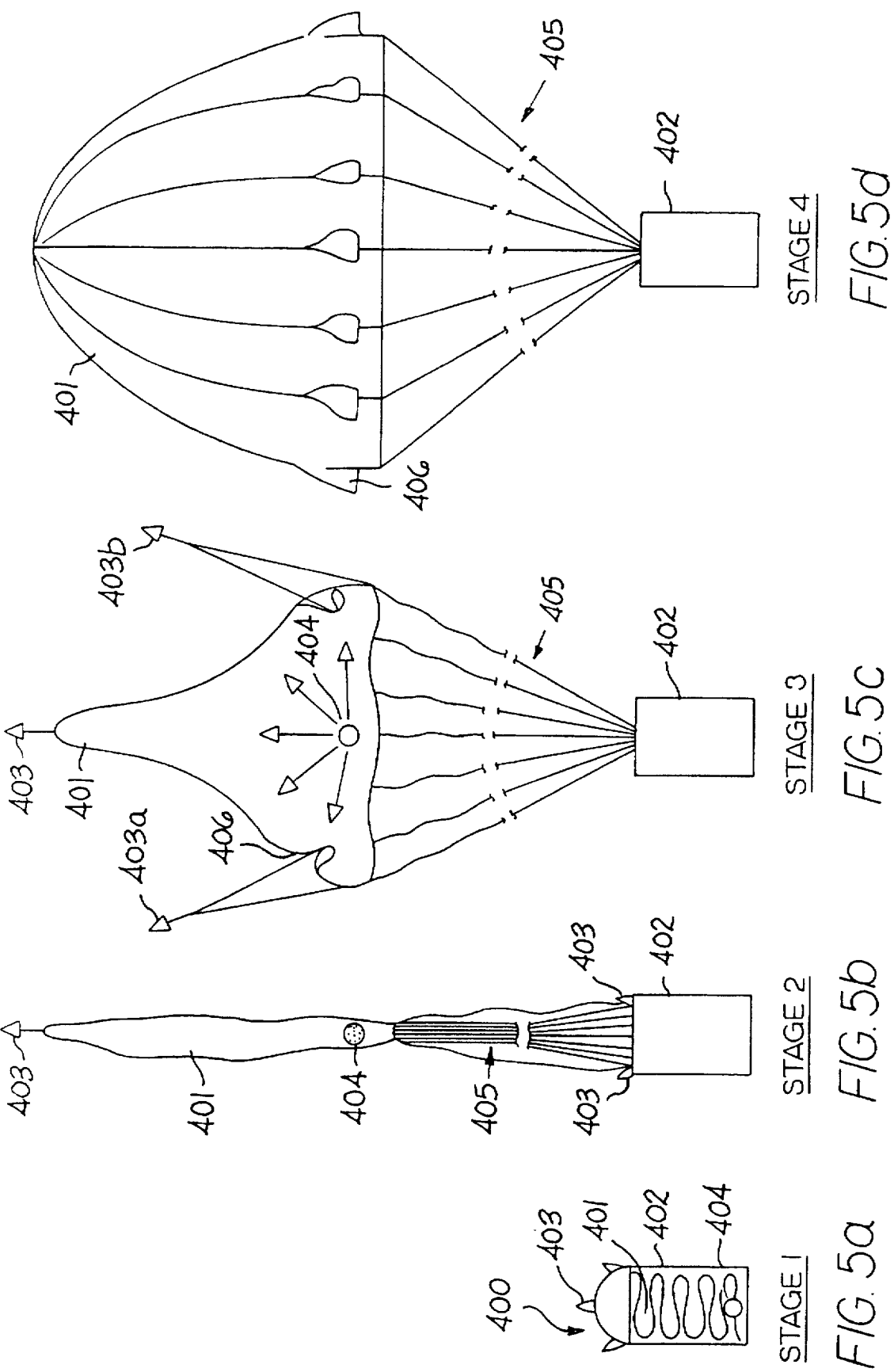

FLIGHT DEVICE

This application is a continuation of application Ser. No. 08/433,495, filed Jun. 28 1995, now abandoned.

The invention described here is a flight vehicle wherein the flight vehicle can be joined and strapped firmly to a load. The load in question is capable of performing piloting functions. With the aid of the flight vehicle the load can be autonomously lifted off the ground and maintained at a height above the ground either in a hover flight or in a flight from one point to another. The load may be either a human pilot P in a more or less upright position or a remote controlled apparatus assuming the pilot function based on commands transmitted by radio.

Flight vehicles of this type are known, utilizing either fuelpowered rocket-boosters, fuel-powered gas turbine engines or fuel-powered gasoline or diesel engines. In the case of rocket engines and gas turbine engines, jets are directed in a downwards direction so that the hot gases therefore represent a danger. This is not only a risk to the pilot, but it also might ignite inflammable materials on the ground, such as dry grass and shrubbery.

Additionally, the high temperature of these gases places a restriction on the choice of materials used in the construction of the flight vehicle. For example plastics and aluminium cannot be used for components exposed to hot exhaust gases.

U.S. Pat. No. 3,023,980 is concerned with a flight vehicle of this type powered by a gas turbine engine. The flight vehicle has a supporting frame which can be strapped onto the back of a human pilot. Aviation gasoline or kerosene, for example, may be used to fuel the gas turbine engine. The gas turbine engine which consists of a radial flow compressor and one or more combustion chambers and a turbine, whereby the compressor and the turbine rotate on a common shaft. The propeller draws in ambient air which is heated in the combustion chamber before returning to the gas turbine. The gas turbine exhaust gases are expanded to ambient pressure through two jet pipes which have nozzles located beside the pilot. The hot gas stream, which has a temperature of about 1200° F. (700° C.), provides the necessary lift force. For the purpose of steering the flight vehicle the hot gas jet can be diverted relative to the engine frame. The exhaust pipes with the nozzles can be shifted relative to the engine frame by means of a control lever. Disadvantages of this flight vehicle are to be seen in the high temperature of the exhaust gases and the fact that the high fuel consumption permits only a short flight duration. The high initial costs of gas turbine engines and the frequent maintenance services are further negative criteria for this vehicle.

U.S. Pat. No. 4,795,111 is concerned with a remote controlled flying platform with a piston internal combustion engine which directly drives an encased or shrouded propeller. Piloted by remote control, this vehicle is used mostly as an observation platform for military but also for civil purposes, whilst the possibility of the platform carrying a human pilot is mentioned, no description is given as to how this can be accomplished. The problem of hot exhaust gases is non-existent with this flying platform. However, the platform as described cannot be strapped to the back of a human pilot. The casing surrounding the propeller opens into a circumferential jet pipe. The exit flow from the propeller, unless guided in suitable ducts, as are being provided in the subject invention, would flow at random over the pilot with loss of thrust and without the possibility of controlling the balance.

Accordingly, there is a need for a flight vehicle of the type initially referred to, with exhaust gases of such a low temperature that they are essentially harmless, and which thus permit optimal selection of lightweight materials for the construction of the flight vehicle. Furthermore, it is desirable that a flight vehicle is able to be airborne for longer periods.

The purpose of the invention described here is to meet this demand. With the object of offering a solution, a flight vehicle of the type initially mentioned is described here. Advantageous further developments of the flight vehicle as provided by this invention are defined in the related claims.

This present invention makes it possible to lift a load—which itself is capable of performing piloting functions and thus pilot the flight vehicle. If the load is a human pilot, the flight vehicle is strapped to a supporting frame. This enables the pilot to remain airborne for a prolonged period (of up to one hour and more). The pilot has the choice to hover freely or fly over a certain distance. The flight vehicle can be powered by, for example, an Otto carburetor—type fuel powered piston engine which—via a driving shaft—drives the overhead propeller, which accelerates the air downwards through two or more vertical jet pipes. Diesel or Wankel type internal combustion engines would also be suitable to power the flight vehicle. Internal combustion engines running on different fuels available can be used.

As the compressor geometry can be selected to the characteristic of the driving engine, it is possible to avoid gears between the crankshaft of the piston engine and the propeller. Direct drive represents a considerable simplification with significant weight saving.

In contrast to a helicopter, which requires special means to counteract the engine torque, in the present invention it is possible to counteract the engine torque by suitable orientation of the exhaust jets. There is no need for a special propeller mounted on an extended structure.

The arrangement of the present invention can be designed to meet the demand for a low weight vehicle. The flight vehicle as per this present invention is readily maneuverable, easy to transport, easy to assemble, and when on the ground can be carried by one person. Starting and operating the controls require simple procedures. The described flight vehicle can also perform flight maneuvers which cannot be performed with other well-known flight vehicles, such as fixed wing aircraft, ultralights, kites, motorised gliding-type parachutes, hang gliders, etc. It is also possible to approach regions or objects which could not be reached easily—if at all—by helicopter, such as narrow mountain gorges. Furthermore, the flight vehicle of this present invention, due to its small and shrouded propeller, can fly between narrow rows of houses, in close proximity to the housewalls, balconies etc.

A decisive advantage which clearly distinguishes this present invention from already known types of flight vehicles is to be seen in the use of an internal combustion or piston engine. Compared with other driving arrangements, such as gas turbine engines, chemical driving systems—for example using hydrogen peroxide—, the piston engine is much more efficient and thus allows considerably longer periods of flight. Furthermore, the piston engine is simple and robust. Due to its low price, the operating costs are relatively low. Service and maintenance costs of piston engines compare favorably with those of gas turbine engines. The fuels for piston engines are commonly available fuels.

In view of the low temperature of the air stream generated by the propeller, the component of the propeller as well as the jet pipes can be manufactured in composite fibre materials. Even if the exhaust gases from the piston engine, as it might be advantageous in some cases, are mixed with the air stream, the temperatures are sufficiently low for the use of composite materials.

The flight vehicle of this invention particularly lends itself to use as a transport vehicle for first-aid workers in rescue operations in locations difficult to access, or in congested areas, such as cities, where, because of heavy traffic or other hindrances, the injured persons cannot be reached in time by conventional transport vehicles. The flight vehicle of this invention can also be used to advantage in rescue actions in the case of fires in high rise buildings where it might be used to ferry endangered persons to safety. This is particularly expedient in cases where conventional means such as rescue ladders or helicopters cannot be used or would not be the most suitable.

Furthermore, the flight vehicle of this invention is a particularly light, small and favourably priced air transport vehicle for which even the smallest space is adequate for starting and landing. As far as the landing and starting environment is concerned, the flight vehicle of this invention is less sensitive than, for example, flight vehicles powered by gas turbine engines. In the case of the latter there is the risk that when near to the ground exhaust gas recirculation will reduce the thrust, or that pollutants such as dust, leaves, small stones etc. may be drawn into the driving system and thus damage the impellor or the turbine.

The flight vehicle of this invention is therefore suitable for accessing locations otherwise not possible cheaply and quickly for example in order to carry out control and supervision assignments. The flight vehicle as per invention is simple to maneuver and enables the human pilot to fly through wooded regions. Flying over longer distances just above ground is also quite feasible. Thus there are numerous possible applications for military purposes. The extended time this flight vehicle can stay in the air and its compact construction is decisive in providing a wide scope of applications. The vehicle described above can also be used as an attractive sports activity.

By virtue of the preferred, novel and particularly simple driving arrangement which comprises a combination of internal combustion engine, shrouded propeller and doubled jet pipe it is possible to achieve optimal directing of the air stream and thus convert the energy of the engine with high efficiency. The direct coupling of the internal combustion engine with the propeller allows the optimal utilization of the RPM range of the internal combustion engine in combination with the aerodynamic design of the propeller. The air stream leaving the jet pipe at subsonic velocity is capable of producing the lift force at higher efficiency than it is possible with the gas turbine engine. Accordingly, the flight vehicle of this present invention has a lower fuel consumption which in turn permits longer airborne periods.

Examples of constructions of the flight vehicle of this invention are discussed in detail below on the basis of sketches with identical parts in the various sketches identified by the same reference numbers.

FIGS. 1a, 1b, 1c, and 1d in each case show a constructional example of a flight vehicle of invention (strapped onto the back of a human pilot) in schematic side view, front view with partial transverse section, front view, and top view;

FIG. 5 shows schematically the mode of functioning of a rescue system of the flight vehicle of this invention as in FIGS. 1a, 1b, 1c and 1d.

Figure 1A:
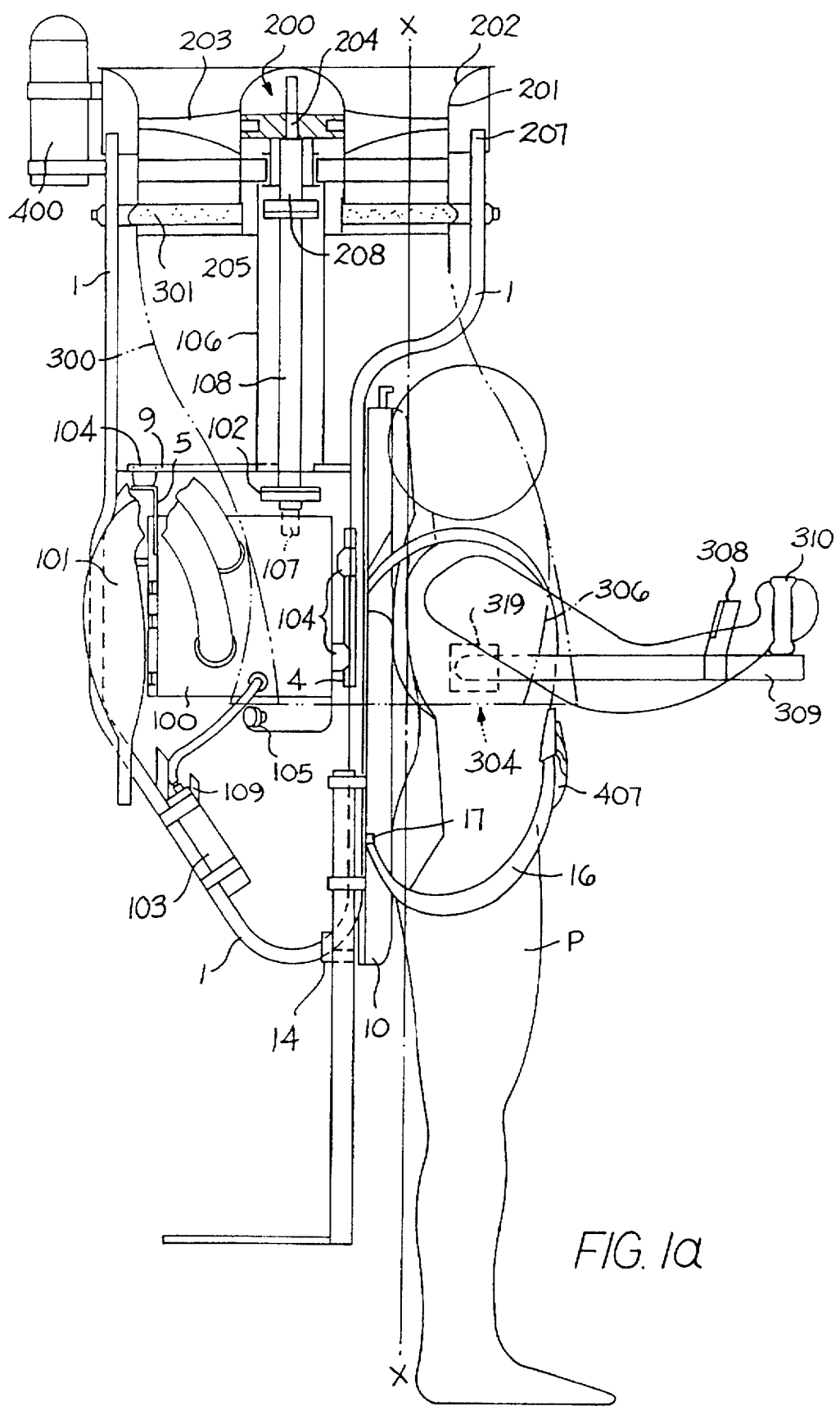
FIGS. 1e, 1f show a water cooler on the air compressor intake funnel for cooling the piston engine.
FIG. 1g shows a cooling rotor driven by the drive shaft and a water cooler part for cooling the piston engine.
FIG. 1h shows water cooling elements at the ends of the jet pipes for cooling the piston engine; also shown is a remote controlled pilot instead of a human pilot.
FIG. 1i shows a bypass system for turbo-charging the engine performance of the piston engine.
FIG. 1j shows a coupling flange designed as a starting belt pulley.

As can be seen from FIG. 1a in particular, the flight vehicle is carried on the back of a human pilot P. A corset also fulfils the function of fuel tank 10 as well as forming the contact surface with the back of the human pilot P. By means of a belt arrangement 9 which forms a seat, a frictional connection is established between the human pilot and the flight vehicle using a strap connection 17. Before and after the flight this is also used by the human pilot to carry the flight vehicle. The centre of gravity X of the flight vehicle with the human pilot or the load respectively runs (when the flight vehicle is in normal flight position) between a driving arrangement 100 and the human pilot P essentially through the middle of the outlet nozzles 304, 305 which are preferably mounted above the common centre of gravity of the flight vehicle and the human pilot P. By means of a gas throttle 310 on one of two steering arms 309 the human pilot P regulates the output of a piston engine which constitutes the driving arrangement 100 and which can be started by means of a hand starter 105. The driving arrangement 100 is supplied with fuel from the fuel tank 10 by a commercially available fuel injection system. The fuel tank 10 may be divided into a number of sections, alternatively there may be a number of fuel tanks.

A shrouded propeller 200 with carbon fibre compressor fins 203 is arranged in such position on the flight vehicle; the propeller shaft is directly coupled with a crankshaft 107 of the driving arrangement 100 by a carbon fibre drive shaft 108, which—when the flight vehicle is in normal flight position—is essentially perpendicular.

The propeller shaft 208 ends in a compressor hub 204 made of aluminium which carries the compressor blades. The propeller shaft 208 preferably runs on self-lubricating bearings. via the air compressor intake funnel 202, arranged above the human pilot , the propeller admits ambient air. After passing the compressor blades, the air passes a carbon-fibre stator 205. This stator serves to remove the tangential flow component. Subsequently, the air flow is distributed between two jet pipes 300, also made of carbon fibres. The outlet nozzles 304, 305 positioned laterally beside the human pilot P at the ends of the jet pipes 300 supply the lift force which carries the human pilot off the ground.

Increasing the performance of the driving arrangement 100 results in a higher rotational speed of the propeller 200. The compressor blades 203 thus increase the air flow which leaves the outlet nozzles 304, 305 at higher exit velocity, thus increasing the lift force.

The carbon-fibre stator blades remove the angular momentum of the air stream leaving the propeller. In this arrangement, the engine power output is converted to a high degree into kinetic energy which is highly efficient. This kinetic energy is fed to the jet pipes 300. This development is a considerable improvement over conventional helicopter design, inasmuch as it has a much smaller rotor diameter. In order to provide sufficient stiffness in the supporting frame, a tubular structure 106 is bolted both to the stator 205' and to the engine foundation 9. Furthermore, the rotor is shrouded which substantially reduces the danger of rotor damage by touching stationary objects. The engine foundation frame 9 is bolted to the structure 1 which connecting spar element 9 is tightly secured to a frame 1 which supports the engine 100, the fuel tank 10, and the shrouded propeller 200.

Figure 1B:
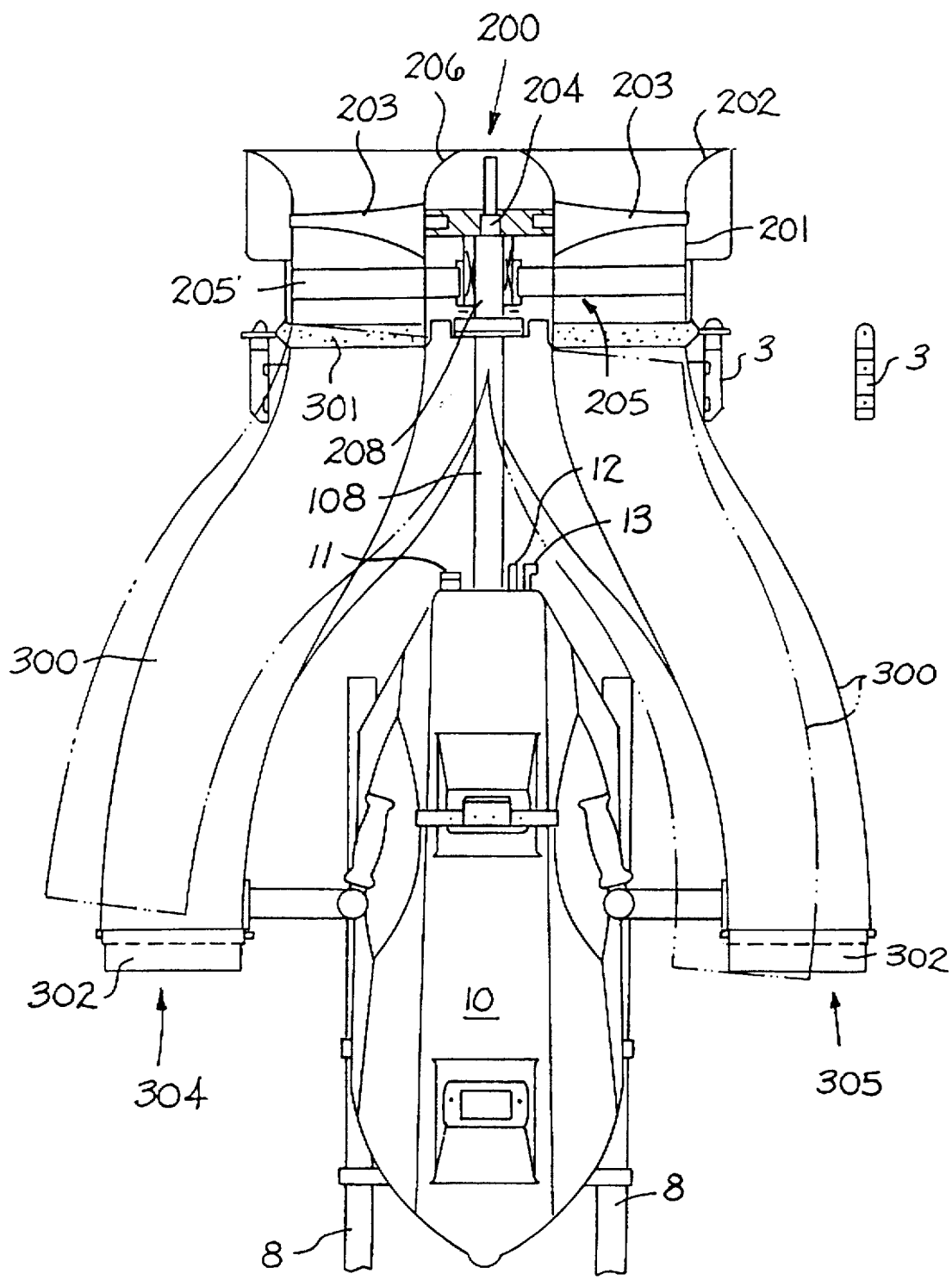
Figure 1C:
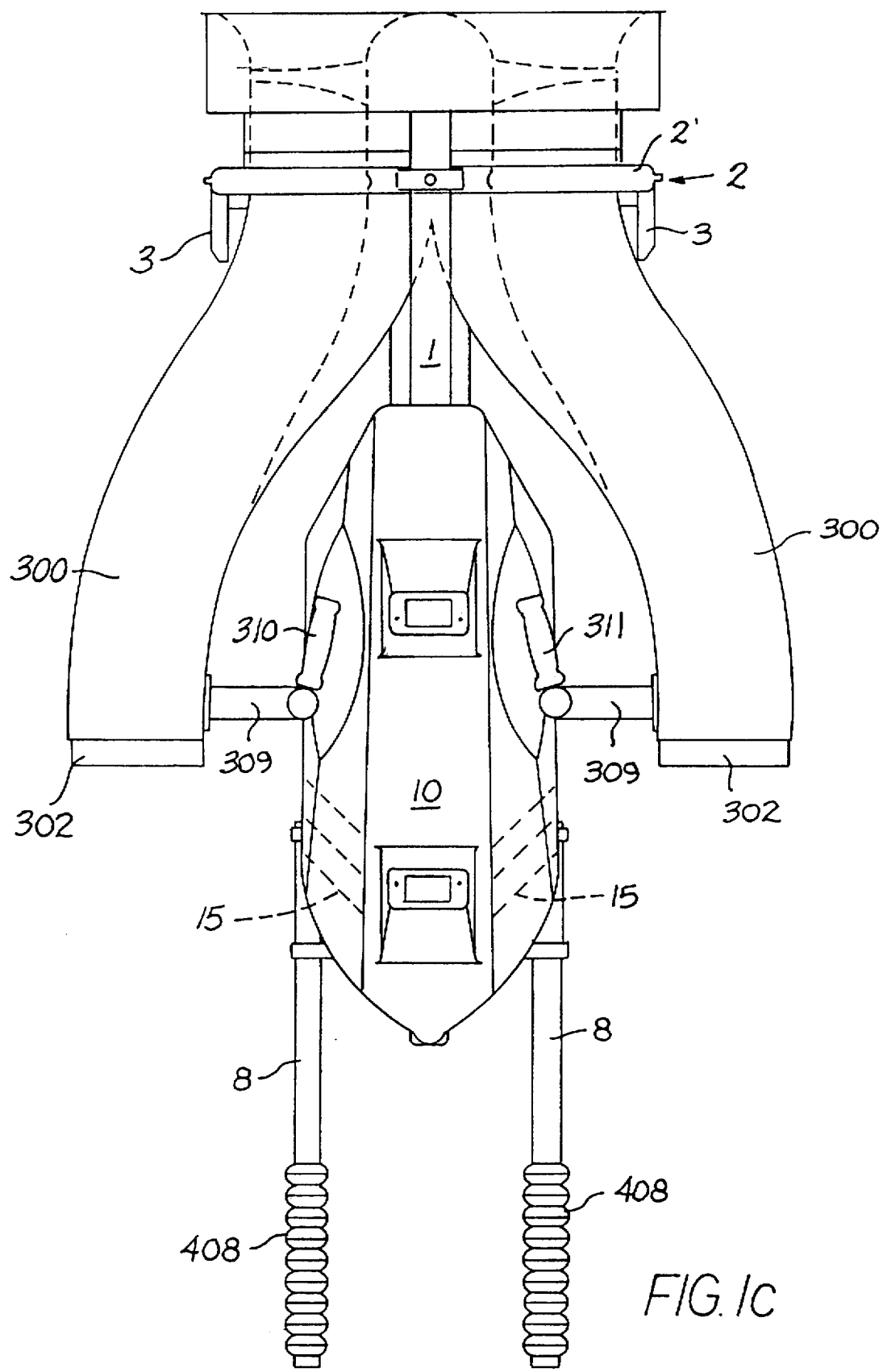
Figure 1D:
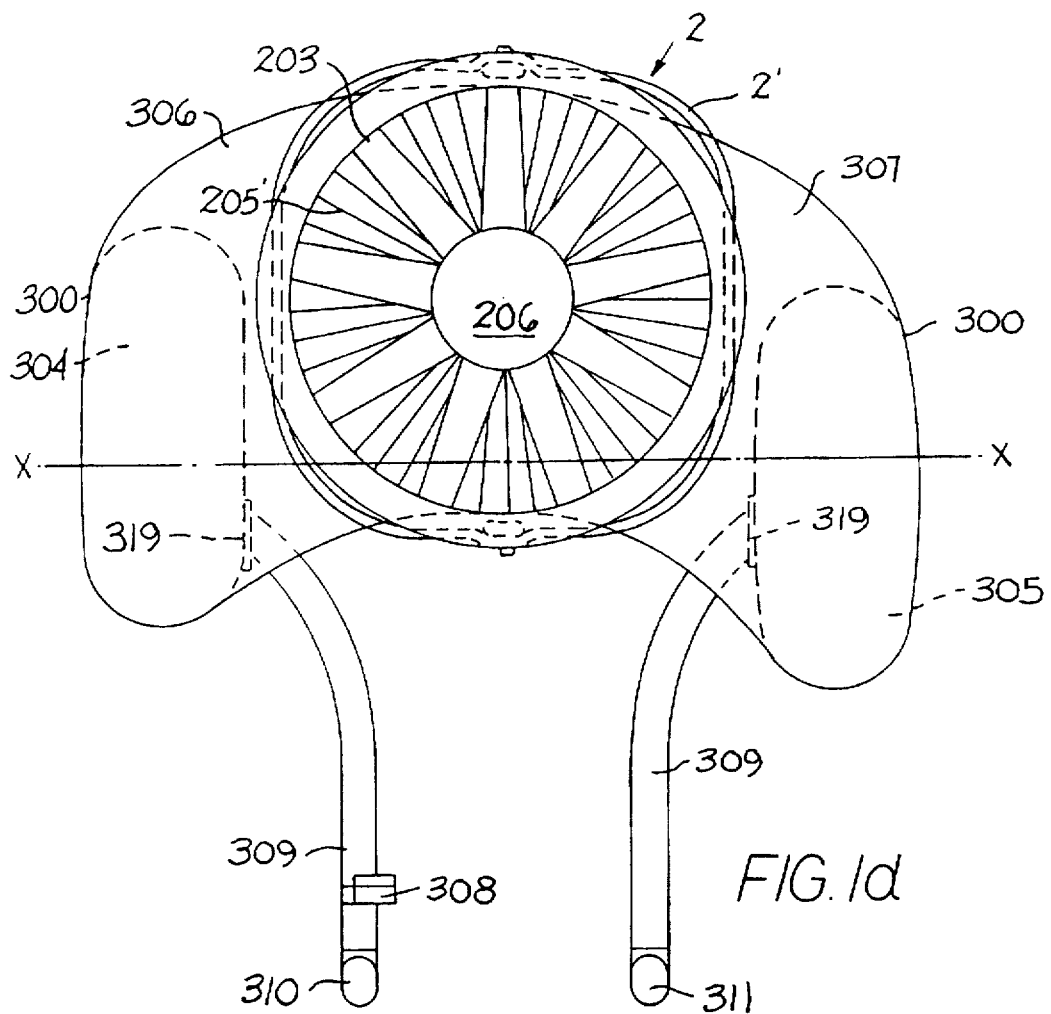
Figure 2:
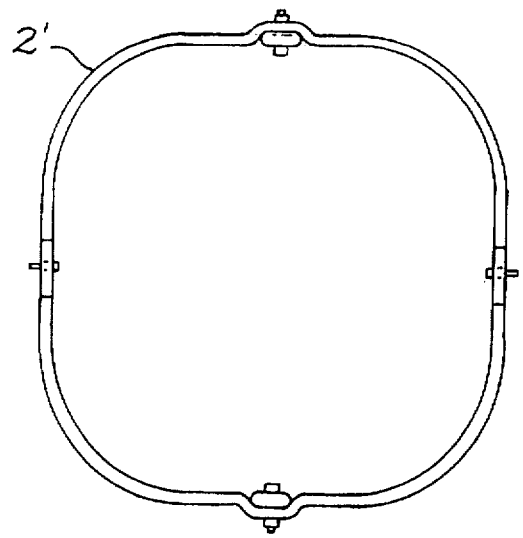
FIG. 2 shows the construction of the universal joint in the vicinity of the propeller.

Both jet pipes 300 and the outlet nozzles 304, 305, located at the outlet, make up a subassembly which can be tilted in any direction up to an angle of about +/−10° (in FIG. 1b the degree of deflection is indicated by broken lines). This change of the flow angle is introduced by steering arms 309 which are coupled with the jet pipes 300. A universal joint 2 (shown in FIGS. 1c, 1d and FIG. 2) connects the subassembly holding the jet pipes 300 with the stator 205 of the shrouded propeller assembly 200. This movement of the nozzles enables the human pilot to control the lift forces generated by the air stream. In order to maintain stability in flight, the jet pipes 300 are moved in such a manner that the resulting lift force is attached to the centre of gravity axis X of the entire flight vehicle, including the human pilot, in vertical direction. Minor changes in the nozzle angle and position allow flight movement in a horizontal direction. This adjustment allows corrections to compensate weight differences between human pilots as well as fuel weight expenditure during the flight.

A method for counteracting the engine torque is obtained by a tangential component of the lift force. This effect is created by the orientation of the jet nozzles 304, 305 (see in particular FIGS. 1a and 1d). Fine adjustment of the engine torque compensation can be effected by means of the trim-tab mechanisms 302 arranged in the air stream of the nozzles 304, 305.

Figure 3:
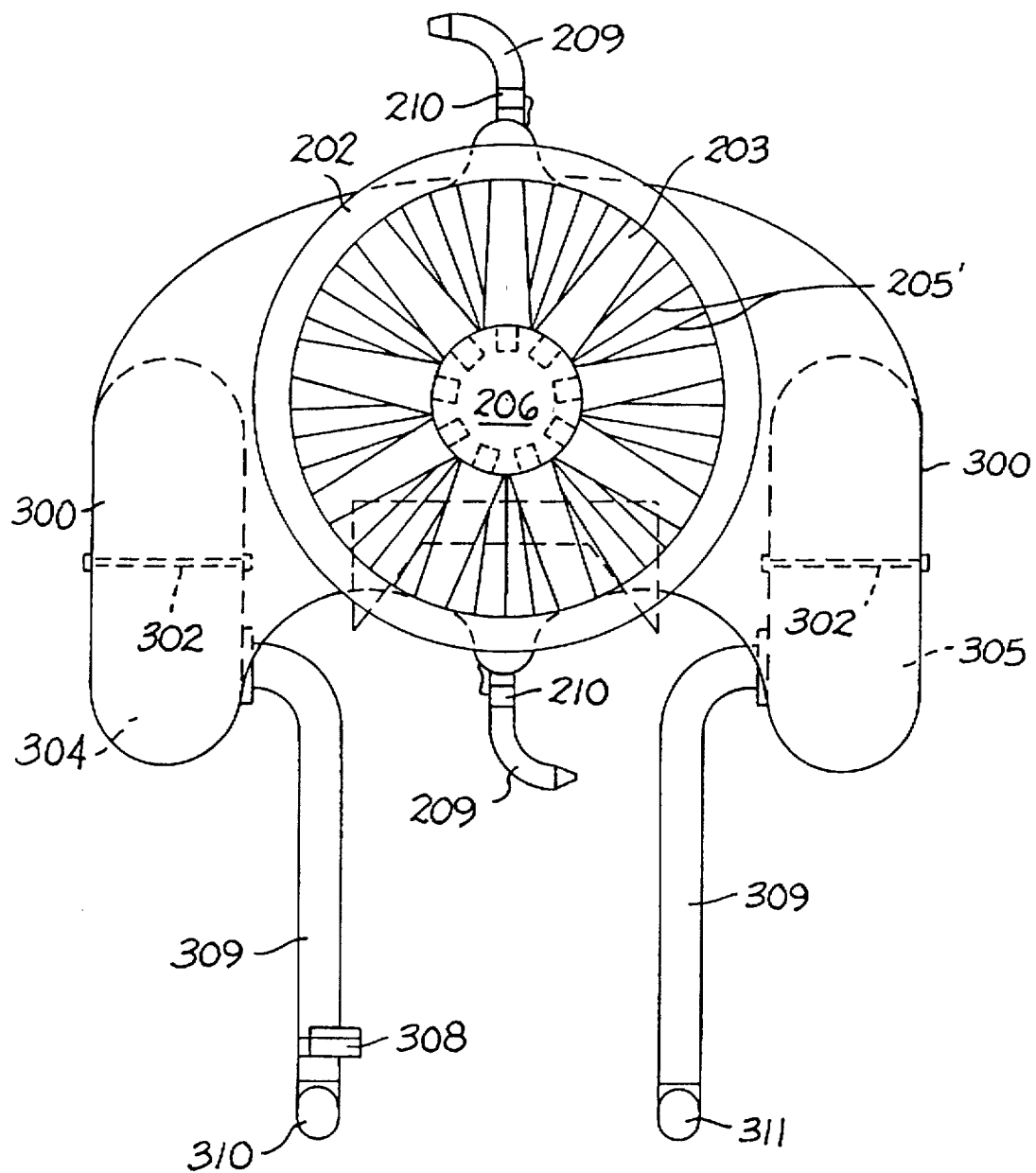
FIG. 3 shows—in schematic top view—a part of the flight vehicle of this invention as in FIGS. 1a, 1b, 1c and 1d to illustrate a possibility for engine torque compensation.

Yet another method for counteracting the engine torque 100 is illustrated in FIG. 3, whereby a small portion of the air stream is diverted. Two separate nozzles 209, which are located in a certain distance from the vertical axis X passing the centre of gravity, direct the auxiliary air stream in a horizontal direction. With the aid of one of the control grips 311 located on one of the steering arms 309, the throttle valves 210 can be adjusted in order to control the air streams (and thus the counter-torque).

The subassembly containing the jet pipes 300 with the nozzles is connected to the main frame by means of a gimbal suspension. This allows to change the position of the jet nozzles relative to the frame, thus shifting the resulting lift force to pass through the centre of gravity. One has to be aware that under this equilibrium the hover flight will occur with a simultaneous translatory and rotatory motion of the flight vehicle. The arrangement described above for the control of counteracting the engine torque is capable to provide the necessary adjustments. The control of the flaps has to be such that the turning motion of the handle compensates the engine torque, whereas the axial motion of the handle controls the flaps in parallel and thus the translatory motion.

With the motion of the subassembly it becomes necessary to seal the gap between the compressor shroud 201 and the subassembly by the use of a compensator 301 or bellows with one or more corrugations or folds. The attachment to the components can be accomplished by clamps or other suitable means. At the inside, the gap is covered by a sliding sleeve, possibly in combination with a suitable flexible seal.

The compressor shroud 201 which encloses the propeller 200 is firmly secured to the frame 1 by means of a suitable structure 207.

Further solutions with regard to the diverting and deflecting of the thrust and for steering the flight vehicle as well as stabilising the equilibrium are illustrated in FIGS. 4a, 4b, 4c and 4d.

Figure 4A:
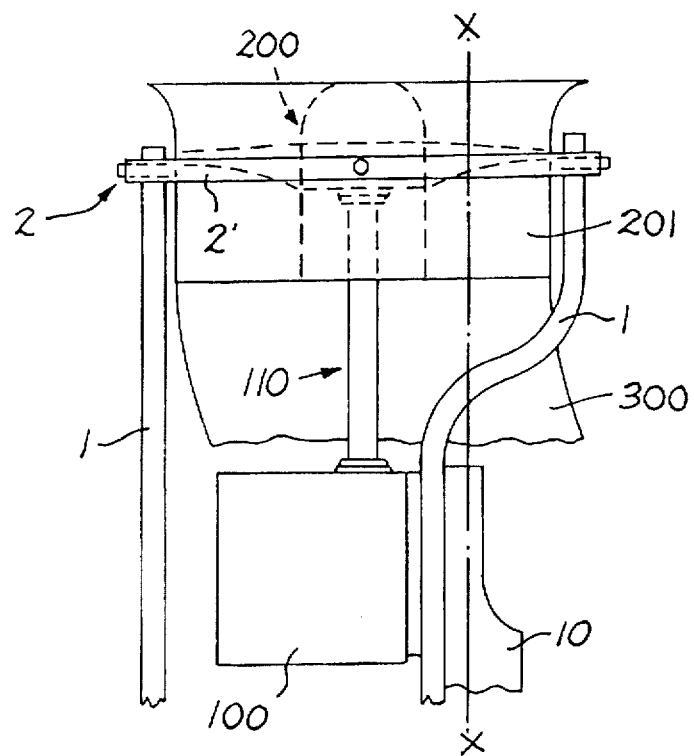
FIG. 4a, 4b, 4c and 4d show in each case in schematic side view a part of the flight vehicle as per invention as in FIGS. 1a, 1b, 1c and 1d to illustrate possibilities for adjusting the direction of the air stream.

From FIG. 4a it will be apparent that the driving arrangement 100 together with the frame 1, the fuel tank 10, and the mounted supporting arrangement constitute a first unit, and that the jet pipes 300 within a subassembly together with the shrouded propeller 200 constitute a second unit, and that the driving arrangement 100 is coupled with the propeller 200 by means of a Cardan shaft 110. This Cardan shaft 110 incorporates, for example, two homokinetic universal joints as illustrated. Steering is effected by displacing the vertical neutral axis X through a universal joint 2 between the first and the second units in the vicinity of the compressor jacket 201.

Figure 4B:
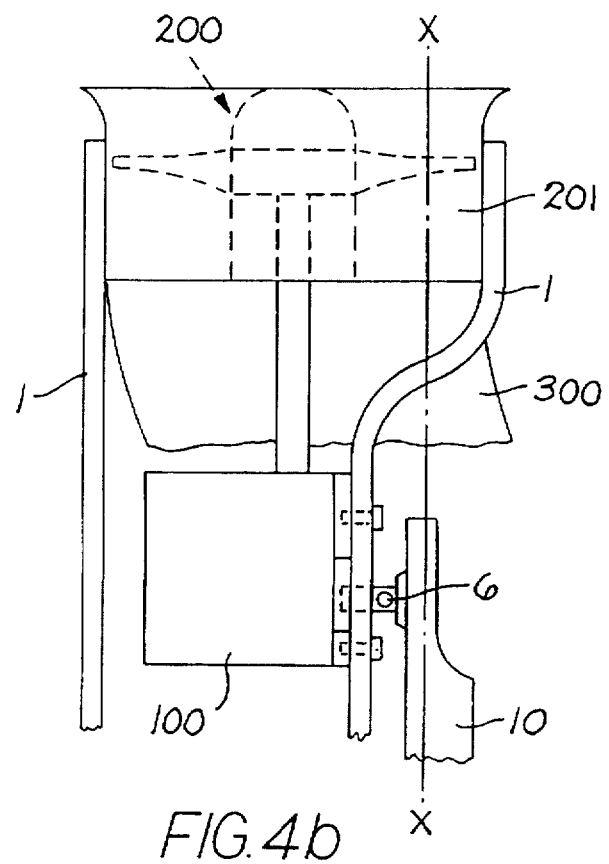

From FIG. 4b it will be apparent that the driving arrangement 100 together with the frame 1, the propeller 200 and the jet pipes 300 in their entirety form a first unit, and that the fuel tank 10 along with the supporting arrangement mounted on it for the human pilot P make up a second unit, whereby the two units are joined together by means of a turning and tilting joint 6 in the vicinity of the supporting arrangement. The flight vehicle can be steered by directing the resultant lift force.

Figure 4C:
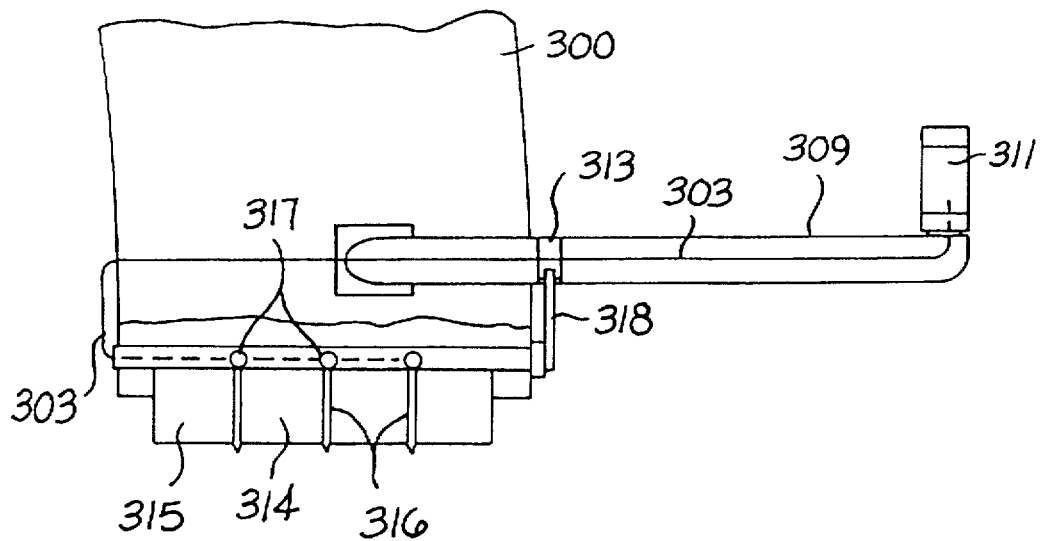

From FIG. 4c it will be apparent that the cross-mounted control fins 315, 316 for steering and stabilising the flight vehicle are fixed length-wise and side-wise to a hollow shaft 314 which can move around its own axis, thus permitting deflection of the air stream in any desired direction. A Bowden cable 303 which moves the control fins via rudder axis 317 and control grip 311 has been fitted in the hollow shaft. By means of this thrust deflection arrangement fitted at the air-exit end of the jet pipe 300, the flight vehicle can be stabilized and steered.

Figure 4D:
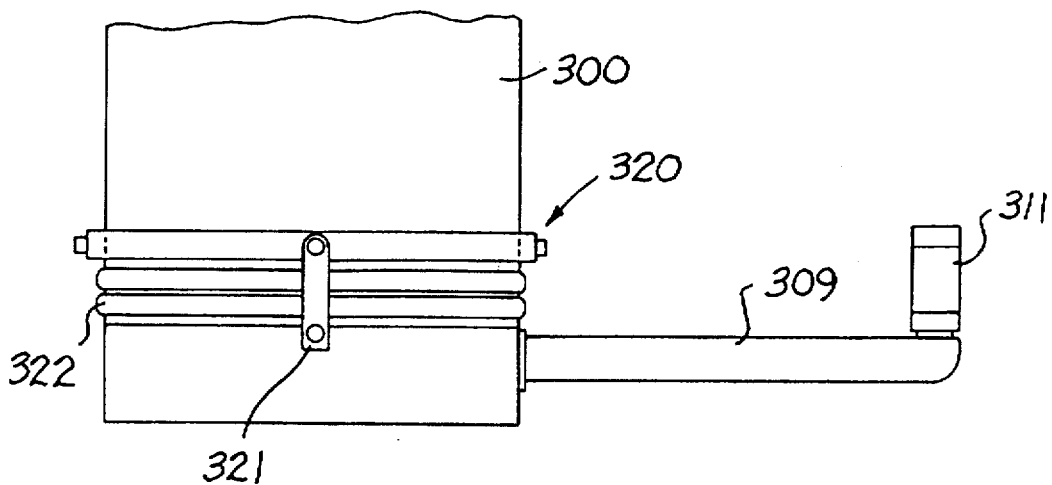

From FIG. 4d it will be apparent that, for the purpose of steering and stabilizing the flight vehicle, control jets 312 have been flexibly coupled at the end of the jet pipe 300 by means of a further Cardan ring 320 and additional couplings 321. The steering arms 309 are firmly coupled with the moveable control jets 300. The movement-free space between the control nozzles 321 and the jet pipes 300 is sealed by means,of an additional deflection compensator 322. Deflection of the thrust permits the achievement of a stable state of equilibrium and steering of the flight vehicle. The use of further Cardan rings 320 to stabilize and steer the flight vehicle would, of course, obviate the need for the universal joint 2.

In order to permit the flight vehicle to turn on its own axis when in hover flight, or to fly through tight curves, the control fins 302 (see FIGS. 1b, 1c), which divert the air stream either forwards or backwards depending on the adjustment, are moved by means of Bowden cable 303 operated by control grip 311. Along with the steering aid this diversion additionally partially equalises the torque of the propeller 200 and the driving arrangement 100. The exhaust system 101 provided for the driving arrangement 100 is an important aspect regarding the engine output in the case of a driving arrangement which relies on an internal combustion engine/piston engine. The end pipes of the exhaust system 101 are directed downwards in the general blasting direction and thus produce added uplift with the engine exhaust gases. A water cooler 103 for cooling the cylinder head of the piston engine is so arranged that the ambient air passes through as much as possible. This passing through of the ambient air can be assured or encouraged by means of suitable air cooling vanes 109 in the airstream of the outlet nozzles 304, 305.

The driving arrangement 100 is secured to the frame 1 by means of an engine mounting 4 with main clamping bolts on vibration absorbers 104. Furthermore, it is also possible to secure the piston engine to the frame 1 via the cylinder head screw coupling on the cylinder head with provision for vibration absorption by means of a cylinder head mounting 5. A vibration-absorbing coupling flange 102 with star-shaped rubber damper blocking for the main shaft or crankshaft 107 couples the latter with the vibration-absorbing drive shaft 108 made of carbon fibres. The fuel tank 10 with the supporting arrangement mounted upon it is bolted directly onto frame 1 with silent blocking. On one of the top sides of the fuel tank 10 is a tank filling connecting piece 13, a tank ventilating valve 12 and an electrical measuring unit 11 to measure the content of the fuel tank. A fuel connecting nipple 14 is located on one of the bottom funnel-shaped tapered ends of the fuel tank 10. Expandable walls 15 or an expansion of the fuel tank 10 prevent swilling of the fuel inside the tank. Instruments 308 to indicate the fuel level inside the fuel tank 10, the rotational speed of the driving arrangement 100 and the operating temperature of the driving arrangement 100 are located on the steering arm 309. An adjustable height stand 8 or standing leg of the flight vehicle is screw-coupled with the frame 1 and permits self-supported parking of the flight vehicle. The stand 8 can be retracted or raised during the flight and is fitted with a shock absorber which acts as impact absorber 408 in the event of the flight vehicle crashing to the ground. The stand 8 can also be designed to have a rotating axis, or to serve as a standing platform for the human pilot during the flight (not illustrated). A jacketing 206 of the compressor driving collar 204 of the propeller 200 enhances the aerodynamic directing of the impelled air.

Figure 1E:
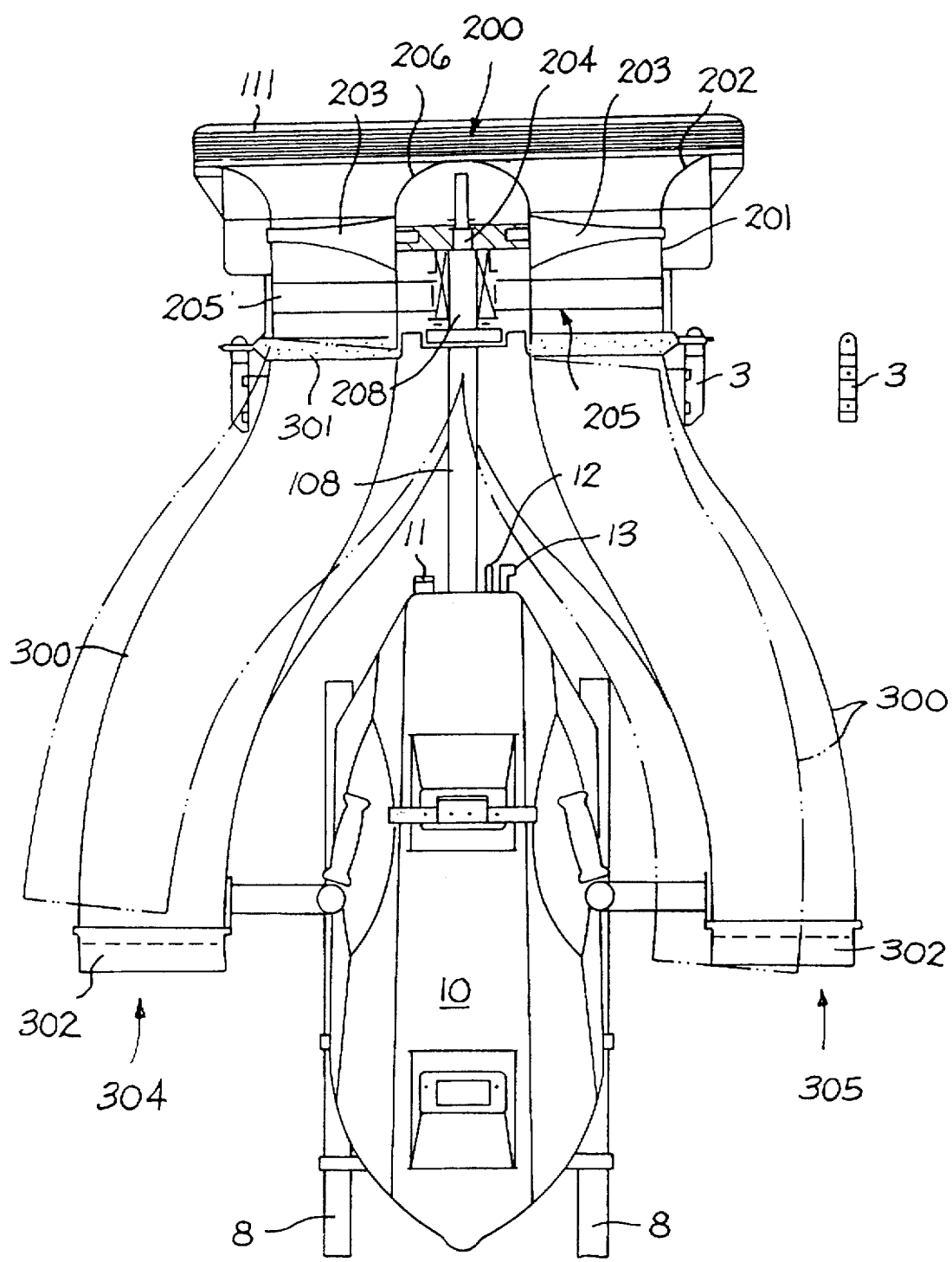

A further variation for the cooling of the piston engine is shown in FIGS. 1e and 1f. A ring water cooler 111 (FIG. 1f) or a ring water cooler 112 with air path ring (FIG. 1f) are of circular design and form a jointless connection with the compressor intake funnel 202 of the propeller 200 which impels part of the approaching air through the ring water coolers 111, 112. By means of the optimal arrangement of the ring water cooler on the edge of the compressor intake funnel 202 as illustrated, and by providing an air conducting ring for improved conveying of air to the ring water cooler the air impelled at higher velocity is not disturbed but rather enhanced.

Figure 1G:
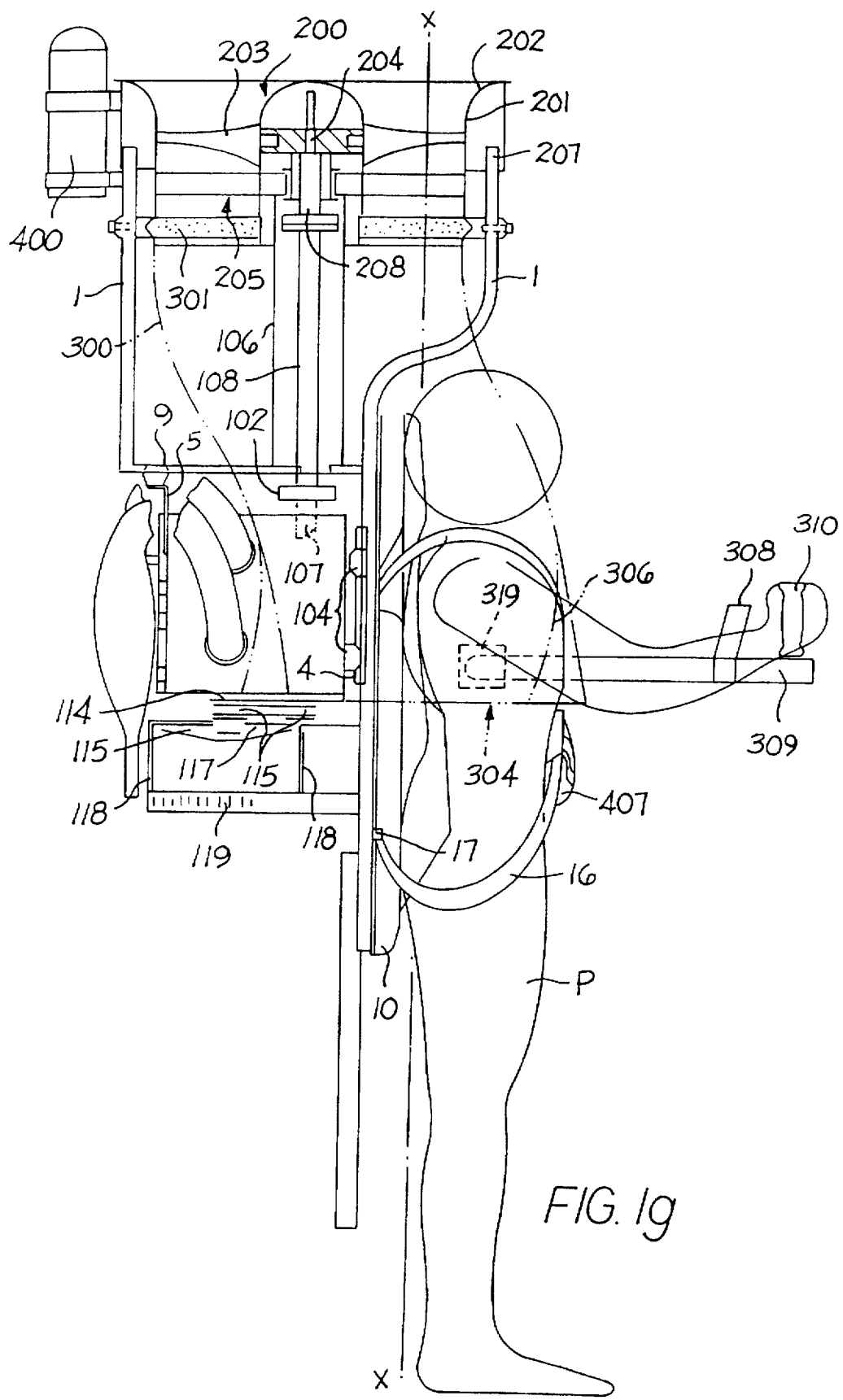

Yet another variation for the cooling of the piston engine/driving arrangement 100 is presented in FIG. 1g. By means of a mounting frame 114 a cooling rotor 115 is fitted below the driving arrangement 100. Driving of the cooling rotor 115 is effected by means of a toothed belt 117 and a belt pulley 116 attached to the bottom end of the crankshaft 107. The air stream set up by the cooling rotor 115 is fed through an air inlet canal 118 to a flat cooler 119 located below. The air flows through the latter. Through the use of belt pulleys 116 with different diameters the rotational speed of the cooling rotor 115 can be varied.

Figure 1H:
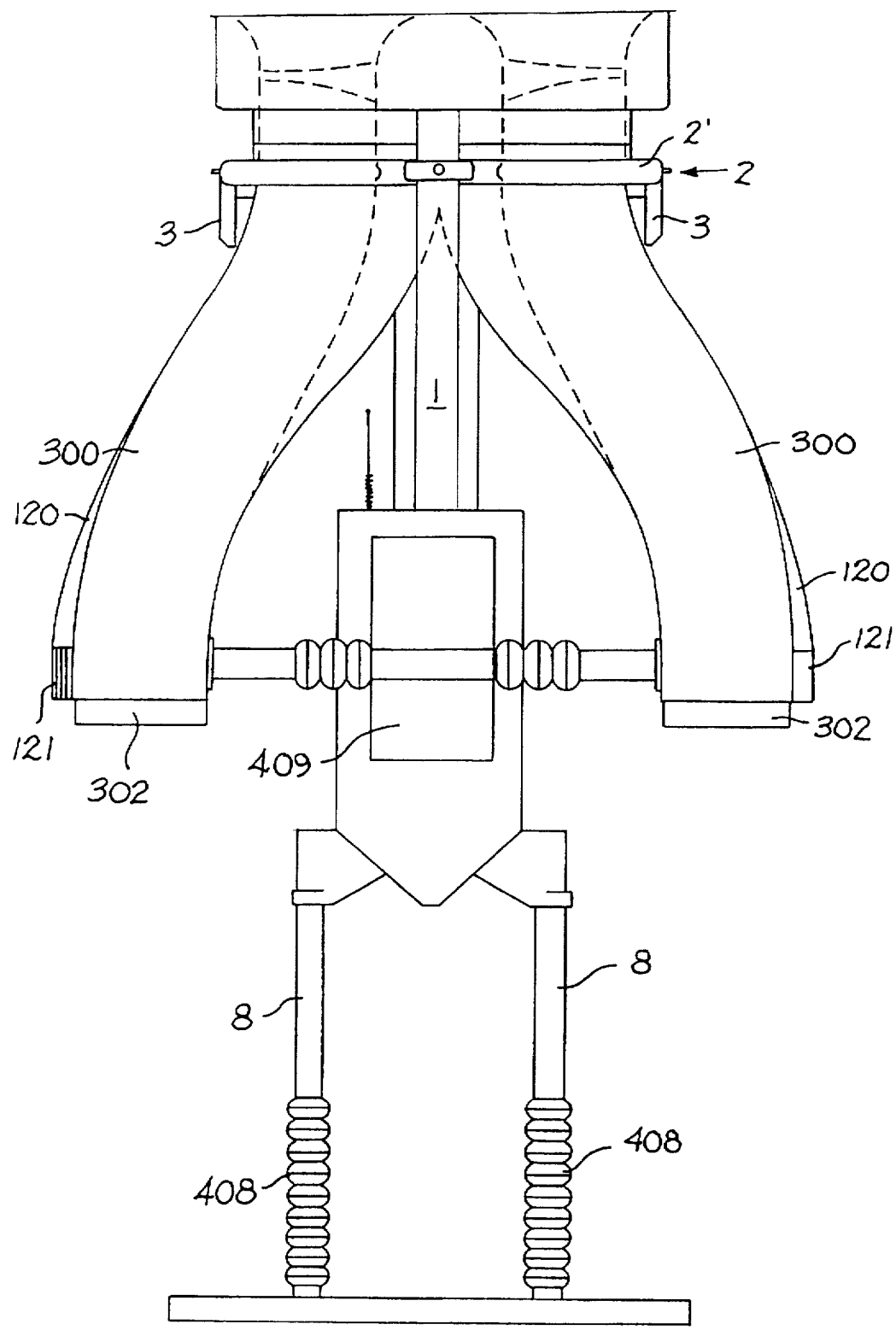

Still another variant for the cooling of the piston engine is shown in FIG. 1h. This Figure also shows the possible replacement of the human pilot P by a remote controlled pilot 409. Cooling of the piston engine is effected by means of air diverted from the main stream into the jet pipes 300 by means of air-conducting canals 120 on the jet pipe and supplied to water-cooling elements 121 fitted to the jet pipe ends. Where the human pilot P is replaced by a remote-controlled pilot 409, it is possible to use the flight vehicle unmanned. In this case the remote-controlled pilot 409 takes over the function of deflecting the jet pipe 300 for steering purposes and for regulating the equilibrium. By virtue of the considerably greater efficiency of the shrouded propeller compared with a helicopter in the same weight category, this type of remote controlled flight vehicle is considered particularly suitable for material transport missions and for monitoring assignments.

Figures 1I, 1J:
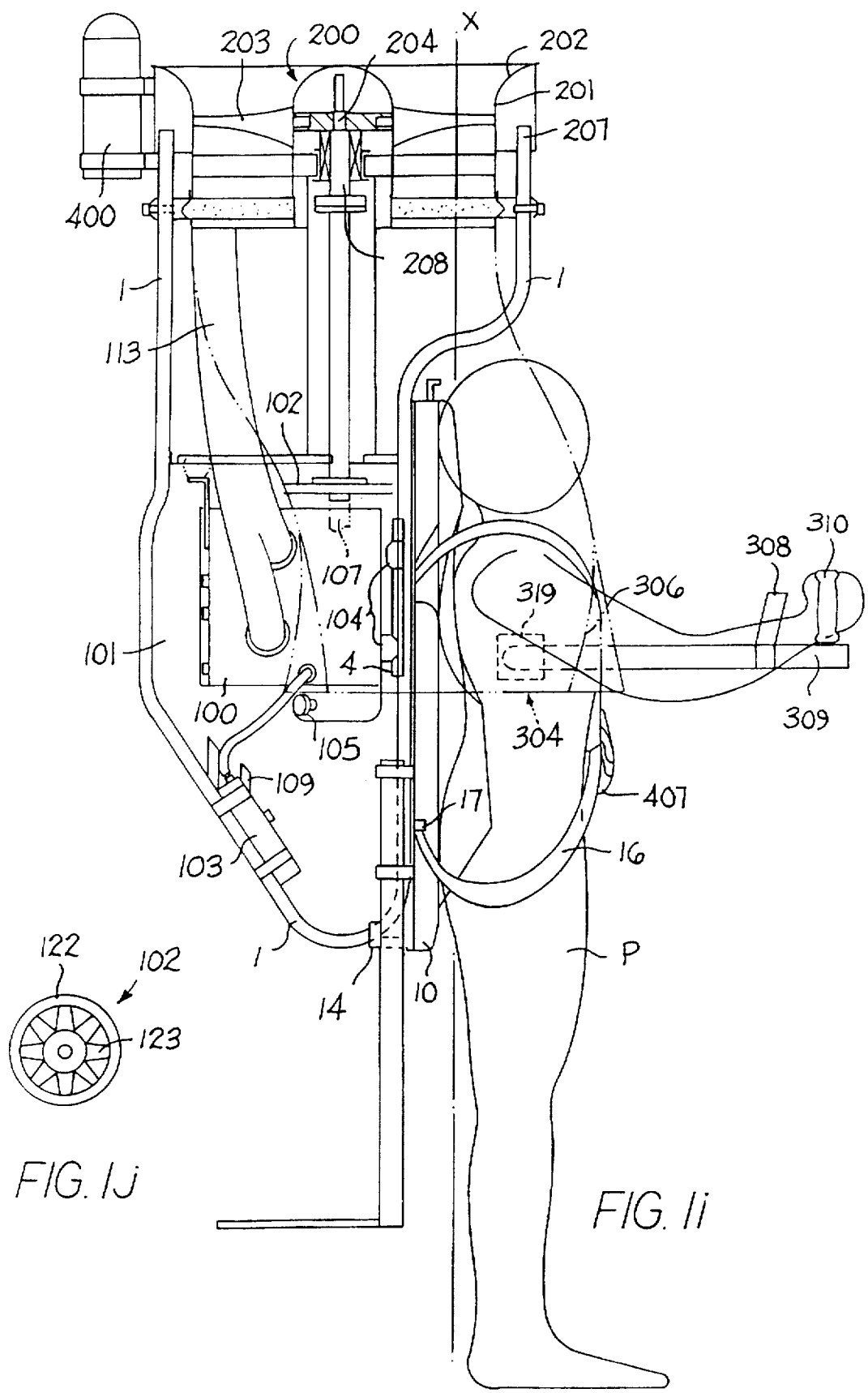

FIG. 1i shows a bypass system for turbo-charging the engine performance of the piston engine. The bypass system 113 is fitted under the stator ring 205 of the shrouded propeller 200 and connected directly to the intake funnel of the engine carburetor.

As shown in FIG. 1j, the engine-side coupling flange 102 can be designed as a coupling flange with starter belt pulley 122 so that the engine can be started by means of a rope wound round the starter belt pulley and pulled by hand. Connecting spokes 123 of the coupling flange with starter belt pulley 122 display a fin-like warping with the result that they provide for air circulation when in rotation, and this cools the components mounted above and below.

As will be seen from FIG. 5, an emergency escape system 400 has been provided comprising a parachute 401 which can be inflated by means of gas cartridges. The mechanism is released automatically or with the activation of an emergency parachute strap. Because of the very low altitudes at which the flight vehicle is normally used, it is essential that the parachute 401 should open extremely quickly in the event of thrust failure. Since the flight vehicle does not have any exposed rotor or fin arrangement, the parachute 401 can be ejected vertically upwards with very short lines.

In the presentation with the designation Stage 1 the parachute 401 is in packed state in a parachute case 402 with gas cartridges 403. The gas cartridges 403 are for accelerated opening of the parachute 401 which has not yet been activated. Also packed along with parachute 401 is an expansion cartridge 404 complete with a suitable detonator. In this case the volume of the parachute is filled up more quickly by means of gas expansion. In the presentation marked with Stage 2 the middle cartridge 403 pulls the parachute 401 out of the parachute case 402 until the parachute lines 405 are fully extended. As shown in Stage 3, these lines activate the auxiliary cartridges 403a and 403b which open the parachute 401 more quickly. The flow straps 406 also contribute towards the faster opening of the parachute 401. At the same time the expansion cartridge 404 located on the underside of the parachute 401 is activated by the auxiliary cartridges 403a and 403b. With their help the parachute 401 is opened within the briefest period. In the phase marked Stage 4 the parachute 401 is in its fully opened state.

Reference list of used numbers:
P Human pilot
X Neutral axis
1 Frame
2 Universal joint
2' Cardan ring
3 Connecting ring
4 Engine mounting
5 Cylinder head mounting
6 Tilting joint
7 Main clamping bolts
8 Stand
9 Engine foundation frame
10 Fuel tank
11 Measuring unit
12 Tank ventilating valve
13 Tank filling connecting piece 14 Fuel connecting nipple
15 Expandable walls
16 Belt arrangement
17 Strap connection
100 Driving arrangement
101 Exhaust system
102 Coupling flange
103 Water cooler
104 Vibration absorber
105 Hand starter
106 Tubular structure
107 Crankshaft
108 Rotating drive shaft
109 Air cooling vanes
110 Cardan shaft
111 Ring water cooler
112 Ring water cooler with air path ring
113 Bypass system
114 Mounting frame
115 Rotor cooler
116 Belt pulley
117 Toothed belt
118 Air inlet canal
119 Flat cooler
120 Air conducting canal
121 Water cooling element
122 Starter belt pulley
123 Connecting spokes
200 Shrouded propeller
200' Propeller
201 Compressor shroud
202 Compressor intake funnel
203 Compressor blades
204 Driving colar
205 Stator ring
205' p Stator
206 Jacketing
207 Suitable structure
208 Propeller shaft
209 Deflection nozzles
210 Throttle valve
300 Jet pipe
301 Compensator
302 Trim-tab mechanisms
303 Bowden cable
304 Outlet nozzle
305 Outlet nozzle
306 Twisted jet pipe
307 Twisted jet pipe
308 Instruments
309 Steering arm
310 Gas throttle
311 Control grip
312 Moveable control valves
313 Hinge
314 Hollow shaft
315 Longitudinally mounted control fins
316 Cross-mounted control fins
317 Rudder axis
318 Connecting rod
319 Screwed connection
320 Further cardan ring
321 Further additional coupling
322 Further additional deflection compensator
400 Emergency escape system
401 Parachute
402 Parachute case
403 Gas cartridges
403a Auxiliary cartridge
403b Auxiliary cartridge
404 Expansion cartridge
405 Parachute line
406 Flow straps
407 Emergency parachute strap
408 Impact absorber

I claim:

1. A flight vehicle with structure for joining and firmly strapping the vehicle to a human or inanimate load, whereby the load itself is capable of performing piloting functions, and with the aid of the flight vehicle is to be lifted off the ground autonomously and maintained at a height above the ground either stationary or in forward flight, the flight vehicle comprising in combination:

a supporting frame with means for attaching the flight vehicle to the load in such a manner as to establish an essentially frictional connection between the flight vehicle and the load, a fuel consuming power drive arrangement (100), which is coupled directly with a single shrouded propeller (200) inducing a gas stream flow path for lifting and guiding the vehicle via a rotating drive shaft (108) wherein the drive shaft and the propeller (200) both rotate at the same speed without intermediate gearing, at least one fuel tank (10) for providing fuel used to propel the driving arrangement (100), at least two jet pipes (300), which open into outlet nozzles (304, 305) fitted on the air outlet ends located laterally beside the load and through each of which a gas stream is discharged, controllable guiding means for adjusting the jet pipes and the nozzles with respect to said supporting frame to change the direction in which the gas stream flows and to discharge such gas streams through the jet pipes (300) by variably diverting a portion of the gas flow stream in a generally horizontal direction resulting in a lift force which enables both the lifting and guiding of the vehicle for flight motion, including hover flight of the load, said shrouded propeller (200) being fitted with an air intake funnel (200), which admits the air with a minimum of losses, said driving shaft (108) being coupled to drive the shrouded propeller (200) further being essentially disposed in a vertical position when the flight vehicle is in the normal flight position, said outlet nozzles (304, 305) being essentially disposed in a plane determined by a vertical neutral axis (X), and means for discharging said gas stream flow through the jet pipes (300) in their entirety at subsonic velocity.

2. Flight vehicle as per claim 1, characterized in that the load is a human pilot (P).

3. Flight vehicle as per claim 1, characterized in that the load is a remote-controlled pilot (409).

4. Flight vehicle as per claim 1, characterized in that the driving arrangement (100) includes an internal combustion engine.

5. Flight vehicle as per claim 1, characterized in that the internal combustion engine is a piston engine.

6. Flight vehicle as per claim 1, characterized in that the gas flow stream from said propeller is at a low temperature permitting the jet pipes (300) and the shrouded propeller (200) to be constructed of and consist of lightweight composite fibre materials.

7. A flight vehicle, comprising in combination: a supporting vehicle frame for frictionally attaching a load to the flight vehicle capable of performing piloting functions and further supporting a single shrouded propeller (200) inducing a gas stream flow path for lifting and guiding the flight vehicle, a propeller rotating engine driving arrangement (100) with a drive shaft directly coupled to the propeller without intermediate gearing, a fuel supply tank (10) for said engine, at least two jet pipes (300) which open into outlet nozzles located laterally beside the load for discharging said gas stream flow path, and manually adjustable means for adjusting the jet pipes to laterally deflect the discharged gas stream flow for providing both lifting and guiding forces for flight motion and hover flight wherein the driving arrangement (100), the shrouded propeller (200) and the jet pipes (300) in their entirety together make up a first unit, and the fuel tank (10) along with the supporting frame mounted upon it make up a second unit, and that these two units are connected together by means of a revolving and tilting joint (6) in order to enable piloting of the flight vehicle by the load which is capable of performing piloting functions.

8. A powered flight vehicle for lifting off the ground, hovering and flight with an attached load which serves to pilot the vehicle, comprising in combination, lift producing means comprising a power unit having a rotary power output shaft directly coupled to a single shrouded propeller configured for producing a downwardly flowing low temperature propulsion gas flow stream, mounting means arranged to position the parts of the vehicle with the rotary shaft vertical in a normal hover and flight pattern comprising light weight fibrous materials, gas exhaust means comprising a set of at least two flexibly mounted jet pipes coupled to exhaust said propulsion gas flow stream from said propeller and extending generally downwardly to produce a lifting force, and controllable guiding means for moving the jet pipes to laterally direct a portion of the gas flow stream thereby to variably divert a portion of the gas flow stream in a generally horizontal direction to establish a flight direction.

* * * * *